United States Patent
Hamby et al.

(10) Patent No.: US 12,413,460 B2
(45) Date of Patent: Sep. 9, 2025

(54) DIGITALLY AUGMENTED VHF ATC COMMUNICATIONS

(71) Applicant: Rockwell Collins, Inc., Cedar Rapids, IA (US)

(72) Inventors: Kenneth K. Hamby, Melbourne Beach, FL (US); James M. Mitchell, W Melbourne, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 70 days.

(21) Appl. No.: 18/381,444

(22) Filed: Oct. 18, 2023

(65) Prior Publication Data
US 2025/0132959 A1   Apr. 24, 2025

(51) Int. Cl.
*H04L 27/20* (2006.01)
*H04L 9/40* (2022.01)

(52) U.S. Cl.
CPC .......... *H04L 27/2071* (2013.01); *H04L 63/08* (2013.01)

(58) Field of Classification Search
CPC . H04L 27/2071; H04L 63/08; H04B 7/18508; H04B 7/18506; G08G 5/57; G08G 5/26; G08G 5/55; G08G 5/21
See application file for complete search history.

(56) References Cited

U.S. PATENT DOCUMENTS

| | | | |
|---|---|---|---|
| 4,369,425 A | 1/1983 | Andersen et al. | |
| 5,448,768 A | 9/1995 | Zinser | |
| 6,128,334 A | 10/2000 | Dapper et al. | |
| 7,221,290 B2 | 5/2007 | Burgemeister | |
| 9,791,562 B2 | 10/2017 | Stayton | |
| 10,205,508 B1 | 2/2019 | Lindsley et al. | |
| 2006/0003781 A1 | 1/2006 | Jin et al. | |
| 2006/0205345 A1* | 9/2006 | Ishikawa | H04B 7/18506 455/12.1 |
| 2007/0072560 A1* | 3/2007 | Ishikawa | H04B 7/022 455/101 |
| 2010/0167723 A1 | 7/2010 | Soumier et al. | |
| 2012/0001793 A1* | 1/2012 | Jacobs | G01S 7/4004 342/146 |

(Continued)

FOREIGN PATENT DOCUMENTS

CA    2182562 A1    8/1995

OTHER PUBLICATIONS

European Search Report received in EP Application No. 24203657.2, Mar. 3, 2025, 11 pages.

*Primary Examiner* — Aristocratis Fotakis
(74) *Attorney, Agent, or Firm* — Suiter Swantz IP

(57) ABSTRACT

A method and system are disclosed for communicating using both analog and digital transmissions on the same bandwidth. The method may include receiving a digital transmission and an analog transmission using a same/shared bandwidth. The method may include playing a digital audio of the digital transmission and an analog audio of the analog transmission using a same audio output. The digital transmission may include an identification code. The playing of the digital audio may include selectively playing the digital audio based on a match of the identification code with a stored identification code of the system and selectively squelching the digital audio based on a mismatch of the identification code with the stored identification code.

17 Claims, 4 Drawing Sheets

(56) References Cited

U.S. PATENT DOCUMENTS

| | | | |
|---|---|---|---|
| 2012/0221233 A1* | 8/2012 | White | G08G 5/34 |
| | | | 701/120 |
| 2013/0070877 A1* | 3/2013 | Wang | H04H 60/23 |
| | | | 455/188.1 |
| 2017/0302798 A1* | 10/2017 | Hunter | H04W 74/0808 |
| 2019/0355265 A1* | 11/2019 | Maddanimath | G08G 5/25 |
| 2022/0166494 A1* | 5/2022 | Judd | H04W 76/20 |
| 2022/0383761 A1* | 12/2022 | Krenz | G08G 5/55 |
| 2023/0245571 A1 | 8/2023 | Casey et al. | |

* cited by examiner

DIGITALLY AUGMENTED VHF ATC COMMUNICATIONS

TECHNICAL FIELD

The present disclosure relates generally to audio communications, and, more particularly, to analog communications and digital communications on the same bandwidth and/or communication protocol.

BACKGROUND

Current Very High Frequency (VHF) Air Traffic Control (ATC) communication systems may sometimes suffer from poor audio quality, message collisions, and/or channel congestion.

Therefore, there is a need for a system and method that can address these issues.

SUMMARY

A method and system are disclosed in accordance with one or more illustrative embodiments of the present disclosure for communicating using both analog and digital transmissions on the same bandwidth. In one illustrative embodiment, the method may include receiving a digital transmission and an analog transmission using a same/shared bandwidth. In another illustrative embodiment, the method may include playing a digital audio of the digital transmission and an analog audio of the analog transmission using a same audio output. In another illustrative embodiment, the digital transmission may include an identification code. In another illustrative embodiment, the playing of the digital audio may include selectively playing the digital audio based on a match of the identification code with a stored identification code of the system and selectively squelching the digital audio based on a mismatch of the identification code with the stored identification code.

In a further aspect, the stored identification code may be an ownship identification code configured to uniquely identify the system. In another aspect, the identification code may comprise a tail number corresponding to a vehicle. In another aspect, the controller may be further configured to transmit a digital outgoing audio message. In another aspect, the transmitting may include beginning a recording of an outgoing audio message based on an activation of a user-activatable element of the system communicatively coupled to the controller, stopping the recording of the outgoing audio message based on a deactivation of the user-activatable element, performing an analog-to-digital conversion of the outgoing audio message, appending the stored identification code to the outgoing audio message, waiting a cancellation time period, and transmitting the outgoing audio message after the cancellation time period. In another aspect, the cancellation time period may enable a cancellation of the transmission of the outgoing audio message based on a second activation of the user-activatable element during the cancellation time period.

In a further aspect, the same bandwidth used by the digital transmission and the analog transmission may correspond to a range of radio frequency electromagnetic waves above at least 30 megahertz. In another aspect, the same bandwidth used by the digital transmission and the analog transmission may be used according to a communication protocol configured for differential 8-phase-shift keying (D8PSK). In another aspect, the communication protocol may comprise VHF Data Link (VDL) Mode 2.

A system is disclosed in accordance with one or more illustrative embodiments of the present disclosure. In one illustrative embodiment, the system may include a controller. In another illustrative embodiment, the controller may be configured to receive a digital transmission using a first bandwidth and to receive an analog transmission using a second bandwidth, wherein the first bandwidth and the second bandwidth are a same bandwidth. In another illustrative embodiment, the controller may be configured to direct a playing of a digital audio of the digital transmission using a first audio output. In another illustrative embodiment, the digital transmission may include an identification code. In another illustrative embodiment, the controller may be further configured to selectively play the digital audio based on a match of the identification code with an ownship identification code of the system and to selectively squelch the digital audio based on a mismatch of the identification code with the ownship identification code.

In another illustrative embodiment, the controller may be configured to play the analog audio using a second audio output, wherein the first audio output and the second audio output are a same audio output such that the system is simultaneously configured for both the playing of the digital audio and the playing of the analog audio. In another illustrative embodiment, the playing of the analog audio may be a non-selective, passthrough playing of the analog audio. In another illustrative embodiment, the system may include a user-activatable element communicatively coupled to the controller and configured for push-to-talk generation of audio recordings. In another illustrative embodiment, the controller may be further configured to transmit a digital outgoing audio message. In another illustrative embodiment, the same bandwidth used by the digital transmission and the analog transmission may correspond to a range of radio frequency electromagnetic waves above at least 30 megahertz. In another illustrative embodiment, the same bandwidth used by the digital transmission and the analog transmission may be used according to a communication protocol configured for differential 8-phase-shift keying (D8PSK). In another illustrative embodiment, the communication protocol may comprise VHF Data Link (VDL) Mode 2.

A method is disclosed in accordance with one or more illustrative embodiments of the present disclosure. In one illustrative embodiment, the method may include transmitting a signal indicative of an ability to receive digital transmissions via a particular communication protocol used with analog communications. In another illustrative embodiment, the method may include receiving a digital transmission via the particular communication protocol, wherein the digital transmission comprises digital audio and an identification code. In another illustrative embodiment, the method may include directing the digital audio to be played to a user and directing the identification code to be displayed via a display for the user. In another illustrative embodiment, the method may include receiving a second transmission via the particular communication protocol, wherein the second transmission is analog and comprises an analog audio. In another illustrative embodiment, the method may include directing the analog audio message to be played to the user.

In a further aspect, the digital audio may be configured to be selectively played based on a match of the identification code with an ownship identification code of a system and to be selectively squelched based on a mismatch of the identification code with the ownship identification code. In another aspect, the identification code of the digital transmission may comprise a tail number corresponding to a vehicle.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

DETAILED DESCRIPTION

Figure 1:
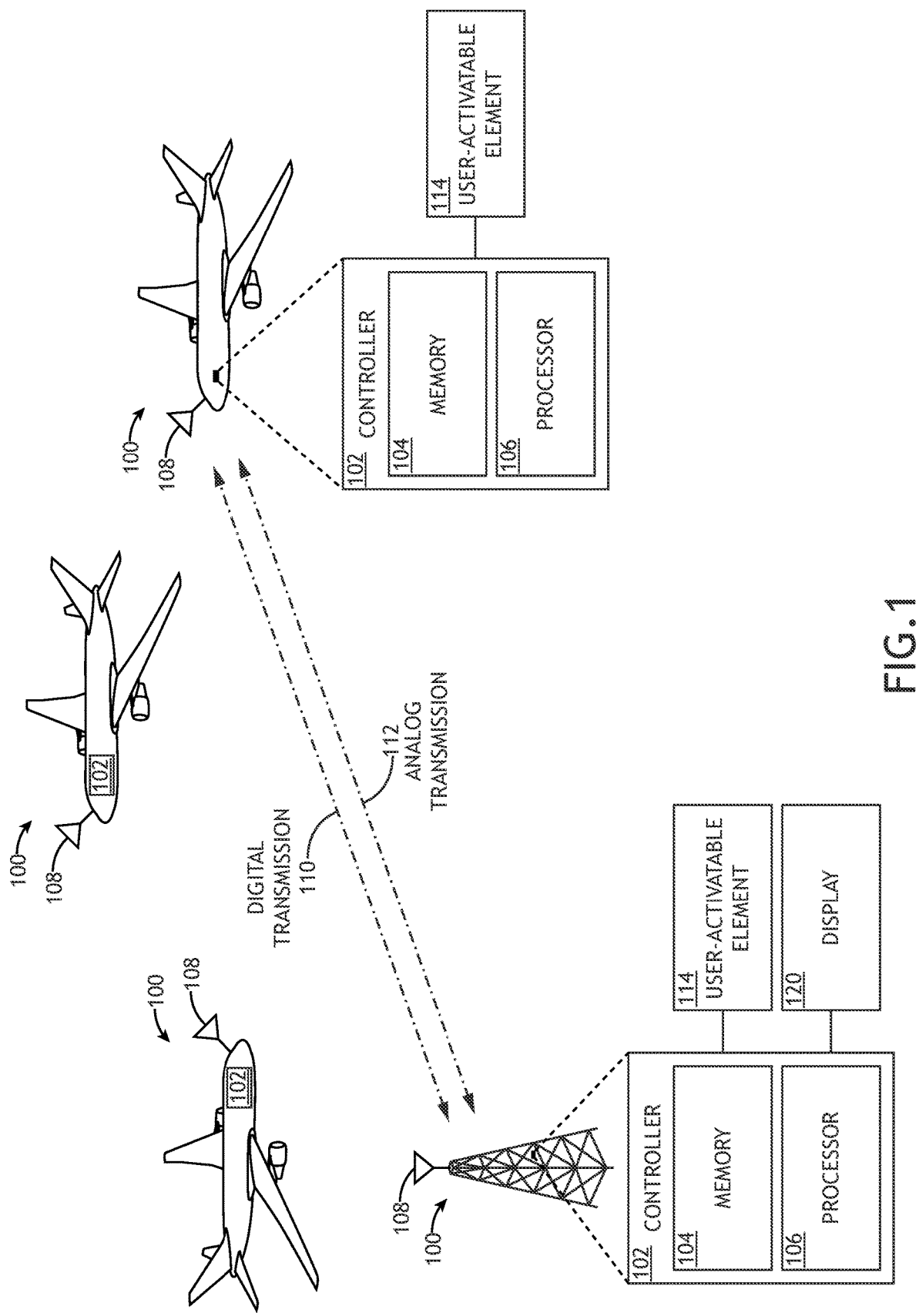
FIG. 1 is a conceptual block diagram of one or more systems for analog and digital transmissions, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

Broadly speaking, embodiments herein are directed to a system and method configured to communicate on the same bandwidth using both digitally encoded and analog modulated audio messages inter-operatively. For example, a bandwidth traditionally reserved for analog communications may be transitioned to a digital-based system over time.

Embodiments may provide for various benefits. Systems may enable digitized voice messaging using analog VHF ATC systems (e.g., analog communication protocols, antennas configured for analog bandwidths). By digitizing a voice message prior to transmission, the amount of time required to send a voice message can be reduced, thereby reducing channel congestion. The audio quality of the digital messages can also be improved due to the elimination of analog amplitude modulation (AM). Message collisions may be reduced by detecting channel availability (e.g., via Control Function) prior to the digital transmissions. The tail number may be appended to the digital transmission, allowing selective calling, and reduced user fatigue. For example, as more messages are switched to digital, even non-digitally equipped systems (e.g., older analog systems) may benefit from digitized systems by hearing short noise bursts (e.g., non-decoded digital transmissions) as opposed to analog messages that they would need to screen for their own aircraft tail number—thereby reducing cockpit workload.

For example, a VHF Data Link (VDL) Mode 2 bandwidth may be configured for both digitally encoded and analog modulated audio transmissions on the same bandwidth. For instance, systems may allow for initiating and/or negotiating which type of communication mode to use, squelching messaging based on relevancy, and features such as message cancellation.

Consider the following scenario, a pilot may communicate using VDL Mode 2 communication in a default 'analog' mode and may hear digital 'bursts' indicative of digital transmissions on the same bandwidth. The digital bursts may contain a tail number and digital audio, and when the tail number matches the pilot's vehicle, the system is configured to play the digital audio. In this way, the digital audio is decoded and selectively played based on relevancy. Ground stations may transmit a signal indicative of their compatibility to transmit digitally and pilots may use this signal to switch to a digital mode. ATC operators of the ground station may be able to hear both analog and digital audio on the same audio output channel, or one or the other, depending on their needs. Note that the above scenarios are not necessarily limiting, and are merely used as illustrative examples of one or more ideas herein.

FIG. 1 illustrates a conceptual block diagram of one or more systems 100 for analog transmissions 112 and digital transmissions 110, in accordance with one or more embodiments of the present disclosure. A system 100 may include a controller 102, a user-activatable element 114 (e.g., push-to-talk button), and an antenna 108. A system 100 may include a display 120.

Figure 2:
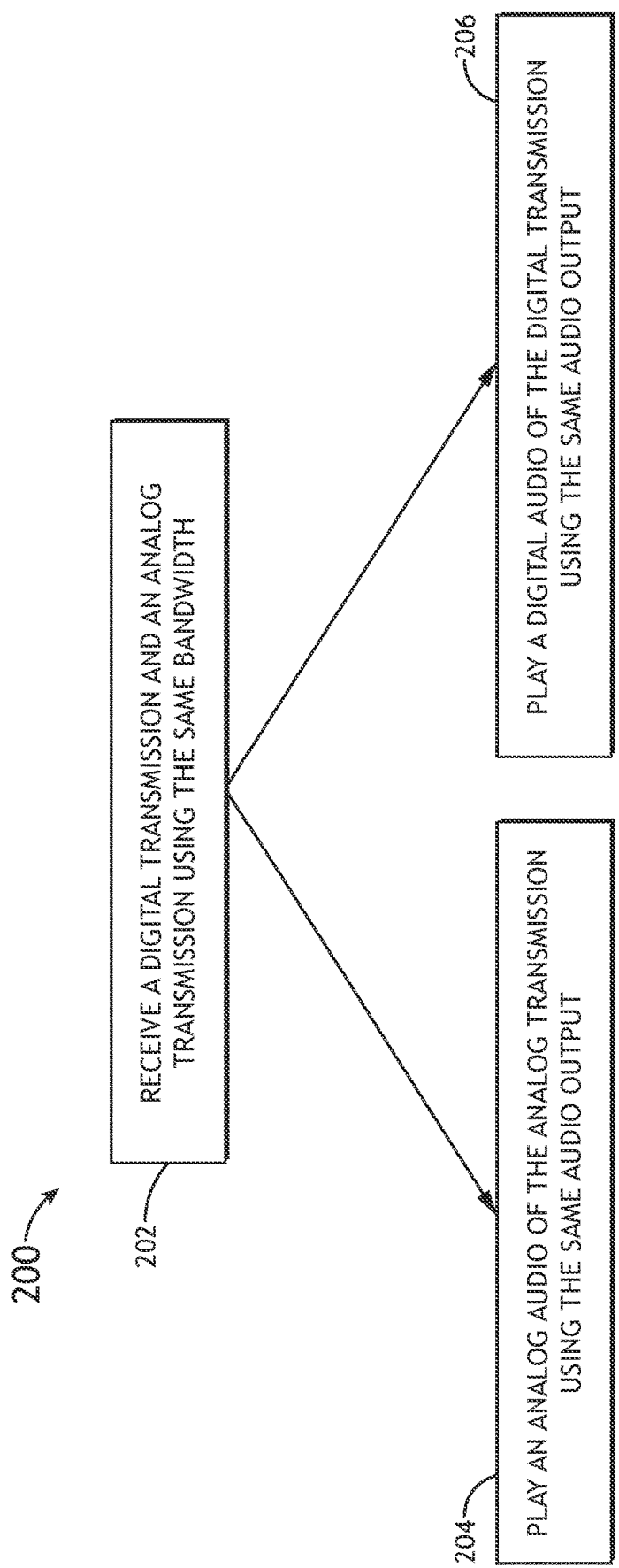
FIG. 2 is a flow diagram illustrating steps performed in a method, in accordance with one or more embodiments of the present disclosure.

FIG. 2 illustrates a flow diagram illustrating steps performed in a method 200, in accordance with one or more embodiments of the present disclosure. Note that for any methods herein that the steps may be performed by a component (e.g., controller 102) of a system 100. For instance, the controller 102 may include program instructions (e.g., software functions, applications, modules, code such as C++, and/or the like) stored on memory 104 and configured to be executed by the processor 106 to perform the one or more steps.

At step 202, a digital transmission 110 and an analog transmission 112 are received using the same bandwidth. For instance, the digital transmission 110 and the analog transmission 112 may be one or more signals received by an antenna 108 of a system 100, wherein the antenna 108 is directly and/or indirectly communicatively coupled to the controller 102 of a system 100. For instance, the antenna 108 may include an electronic scanning antenna (ESA), mechanically steered antenna, omnidirectional antenna, and/or the like.

At step 204, an analog audio of the analog transmission 112 is played. For example, the analog audio may be amplitude modulated analog audio and played using any method known in the art. For instance, the analog audio may be played in a headset of a user (e.g., pilot, air traffic control operator, and/or the like). The analog audio may be played on a first audio output, which may be the same audio output used to play the digital audio. For instance, the analog audio may be configured to be played on a headset, audio output jack, audio channel that is thereby used for playing audio, and/or the like. For example, the audio channel may be virtually defined via software such that a same headset/output is used to play (e.g., played sequentially) the analog and digital audio.

At step 206, a digital audio of the digital transmission 110 is played. For example, as noted above, the same audio output may be used to play the digital audio. In embodiments, the system 100 may automatically (e.g., via program instructions) and/or be configured to receive input (e.g., via a selection of a user on a mechanical switch or software-defined area of a touchscreen of a display) such that the system 100 is configured to switch between a digital mode and/or an analog mode. For instance, the digital mode may be configured to only play digitally decoded digital audio and the analog mode may be configured to play all received transmissions in analog as well as digital bursts for digital transmissions.

The system 100 may be configured to play analog and/or digital audio as well as be configured to squelch and/or not squelch. For example, when the system 100 is in an "all call" mode, the system may be configured to play all digital audio, regardless of identification codes (e.g., tail numbers) and all analog audio. In this way, the system 100 may be configured to switch between a digital mode, analog mode, and all call mode.

The digital audio may be selectively squelched (i.e., muted, not played) to reduce user fatigue based on relevancy of the digital audio. For example, the playing of the digital audio of step 206 may include selectively playing the digital audio based on a match of the identification code with a stored identification code of the system 100. The playing of the digital audio of step 206 may include selectively squelching the digital audio based on a mismatch of the identification code with the stored identification code. For example, a ground station and/or aircraft system 100 may be configured to decode digital transmissions 110 into digital audio and an identification code. The system 100 may selectively determine whether to play (or not play) the digital audio based on the identification code. For instance, the system 100 may be configured to compare/match the identification code to one or more stored/known identification codes in memory 104 and/or any other comparison (e.g., algorithmically determine whether the identification code is relevant to the system 100 and/or user based on one or more factors such as a heading of the aircraft, location of the aircraft, planned action/landing/departure, type of user, type of vehicle/aircraft, and/or the like).

Figure 3:
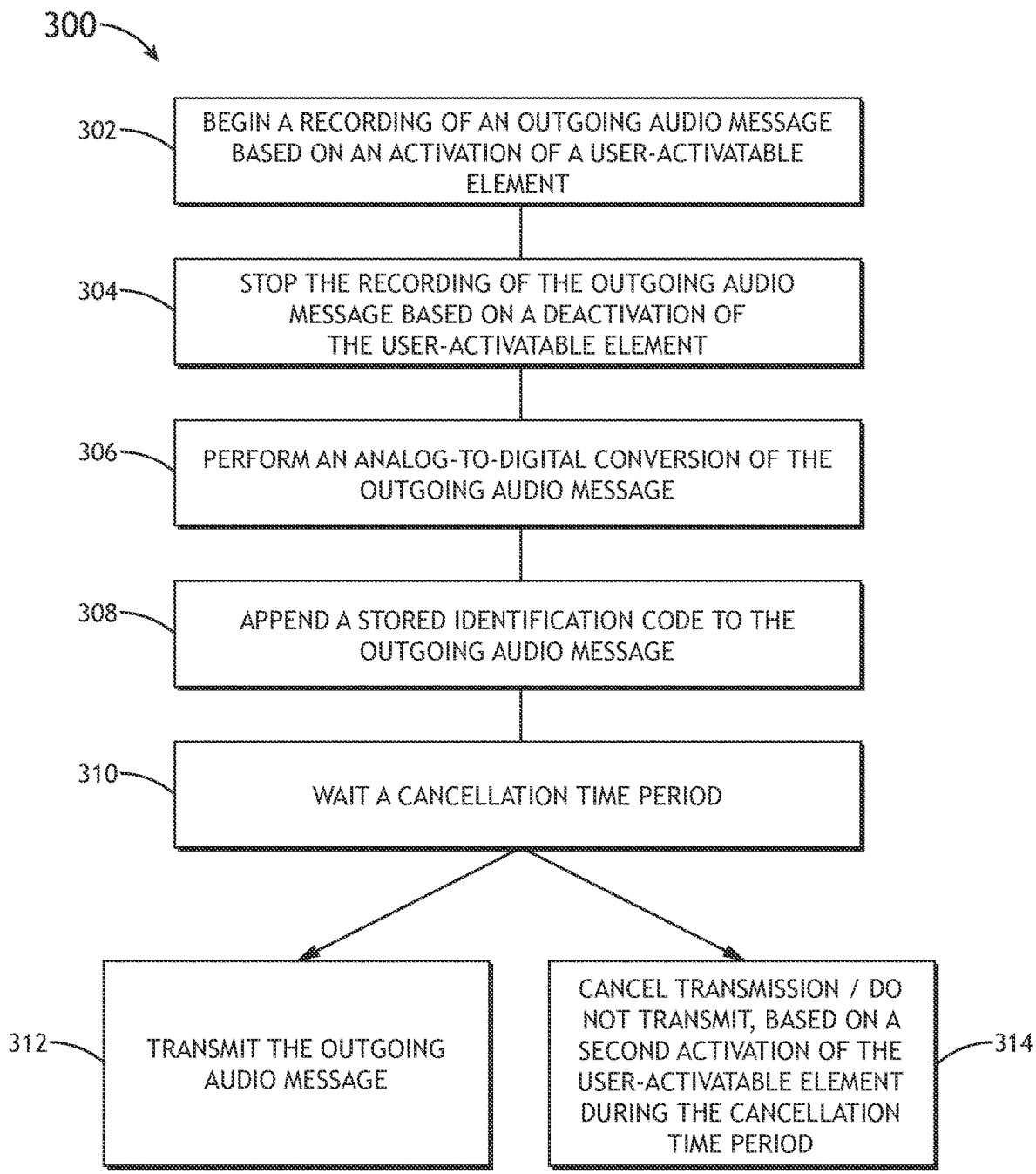
FIG. 3 is a flow diagram illustrating steps performed in a method, in accordance with one or more embodiments of the present disclosure.

FIG. 3 illustrates a flow diagram illustrating steps performed in a method 300, in accordance with one or more embodiments of the present disclosure.

At step 302, a recording (e.g., sound recording of a pilot's spoken message) begins of an outgoing audio message based on an activation of a user-activatable element 114 (e.g., push-to-talk mechanism). Not that the word "outgoing" is merely used to distinguish from audio that is externally received, and the outgoing audio message may, in some embodiments, be cancelled from being transmitted. Outgoing audio from one system 100 may be a received audio from the point of view of another system 100.

The user-activatable element 114 may be (or include) any element, such as an area of a touchscreen and/or physical element (e.g., button, switch, toggle, knob, trigger, and/or the like). The user-activatable element 114 may be configured to return to a rest position upon release, such as a button coupled on top of a compression spring. The user-activatable element 114 may be coupled (e.g., electronically coupled) to the controller 102, such that the controller 102 is configured to sense the activation and deactivation of the user-activatable element 114. For instance, the system 100 may include a button user-activatable element 114 configured to be used as a push-to-talk feature. The feature may allow cancelling the audio message before being sent by pushing the button again quickly, such as described in steps 310 and 314.

At step 304, the recording of the outgoing audio message stops based on a deactivation of the user-activatable element 114 (e.g., releasing the push-to-talk mechanism).

At step 306, an analog-to-digital conversion of the outgoing audio message is performed. For example, the outgoing audio message may be stored on memory 104 in a digital format and/or encoded digitally (e.g., encoded for differential 8-phase-shift keying (D8PSK)).

At step 308, a stored identification code is appended to (e.g., aggregated with) the outgoing audio message. For example, the stored identification code may be an ownship identification code (e.g., a code corresponding to the system 100 or a vehicle/aircraft comprising the system 100) configured to uniquely identify the system 100. For instance, the identification code may be known (e.g., uniquely assigned, such as a tail number corresponding to a vehicle), dynamically assigned via negotiating with a ground station, stored in a registry, and/or be randomly generated using enough bits (e.g., more than 40 bits) so as to not be statistically likely to be used by another system.

At step 310, a cancellation time period is waited for. For example, the controller 102 may be configured to wait a known amount of time before transmitting, in case a user wishes to cancel a transmission. For instance, the cancellation time period may be, but is not necessarily limited to, approximately (e.g., within plus or minus 20%) 1 second, 1.3, 1.5, 1.7, 1.9, or 2 seconds.

At step 312, the outgoing audio message is transmitted. For example, the outgoing audio message may be selectively transmitted. For example, the system 100 may be configured to direct a (digital) transmission 110 of the outgoing audio message (e.g., including a stored identification code) using the antenna 108 and using a bandwidth (i.e., the same bandwidth used for analog transmissions, a shared bandwidth, a substantially similar overlapping bandwidth used in analog transmissions (such as at least 70% overlap), etc.).

The bandwidth may correspond to a range of radio frequency electromagnetic waves above at least 30 megahertz.

The bandwidth may be used according to a communication protocol configured for differential 8-phase-shift keying (D8PSK).

For example, a VHF Data Link (VDL) Mode 2 bandwidth may be configured to be used for both digitally encoded and analog modulated audio transmissions on the same bandwidth. For example, the communication protocol may include VHF Data Link (VDL) Mode 2.

At step 314, a cancellation of the transmission of the outgoing audio message is performed based on a second activation (and/or deactivation) of the user-activatable element 114 during the cancellation time period. I.e., performing a cancellation means not transmitting. For example, a system 100 may be configured to allow a user to quickly push a push-to-talk button element 114 after stopping a recorded message to cancel the message such that the message is not sent.

Figure 4:
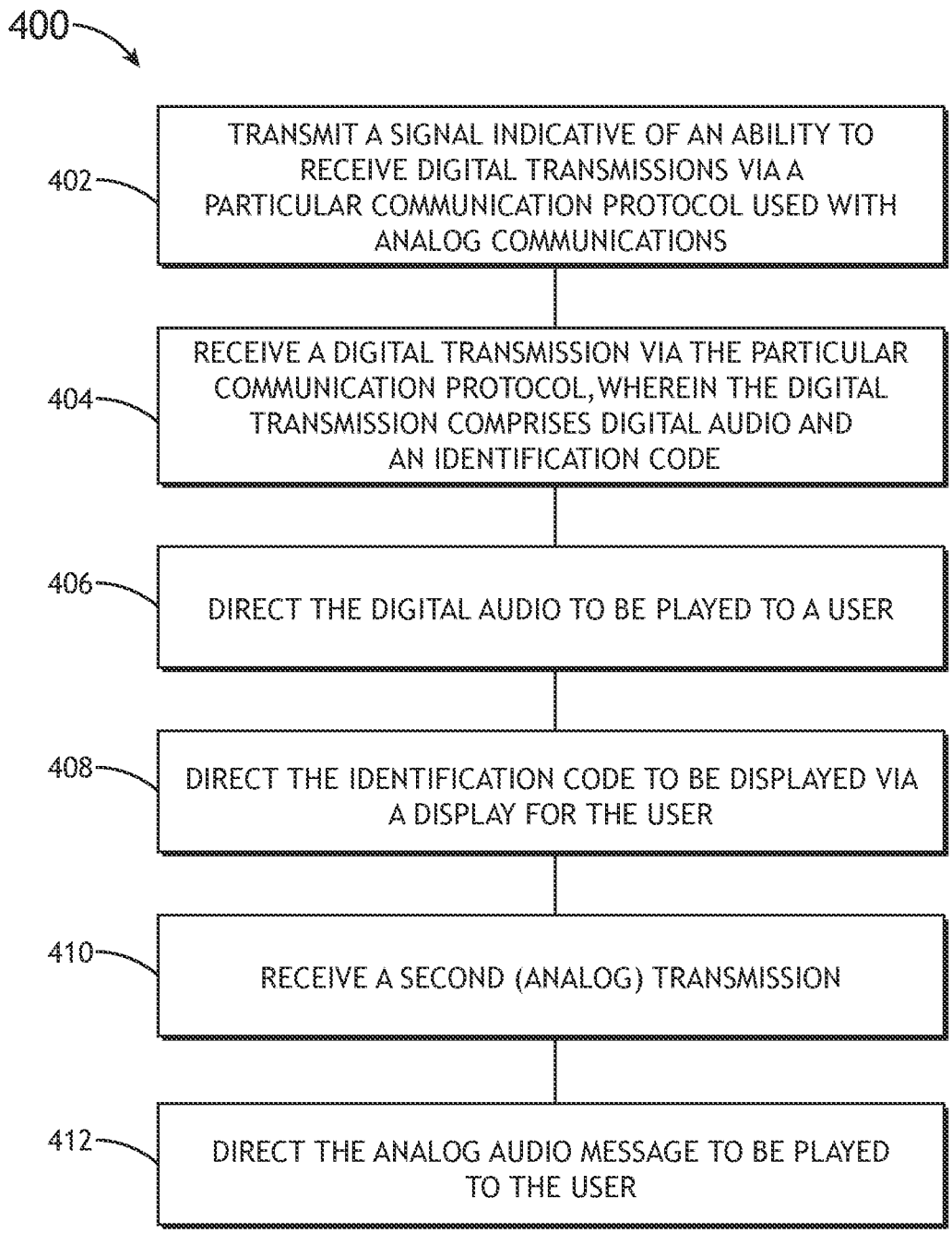
FIG. 4 is a flow diagram illustrating steps performed in a method 400, in accordance with one or more embodiments of the present disclosure.

FIG. 4 illustrates a flow diagram illustrating steps performed in a method 400, in accordance with one or more embodiments of the present disclosure.

At step 402, a signal (e.g., omnidirectional signal without tail numbers) indicative of an ability to receive digital transmissions via a particular communication protocol used with analog communications is transmitted. In embodiments, the process for communication with a digitally-equipped ground station may include transmitting (e.g., transmit via a ground station) a signal indicative of an ability to receive digital transmissions via a particular communication protocol (e.g., VDL Mode 2) used with analog communications. For example, a system 100 (e.g., airport) may be configured to transmit to all aircraft that it is compatible with digitally encoded transmissions in the particular communication protocol (e.g., VDL Mode 2) used with analog communications. Another receiving/transmitting system 100 (e.g., aircraft) may receive the signal indicative of the first system's 100 ability to receive digital transmissions. The other system 100 may be configured to switch and/or allow a switch to a digital compatible mode (e.g., digital-only mode, and/or digital and analog mode) such that audio is thereafter configured to be transmitted digitally from the other system 100.

At step 404, a digital transmission 110 is received (e.g., received from the aircraft to a ground station) via the particular communication protocol, wherein the digital transmission comprises digital audio and an identification code (e.g., tail number of the aircraft).

At step 406, the digital audio is directed (e.g., via software instructions of a controller 102) to be played to a user (e.g., played via an audio output jack, audio software module, speakers, headset, and/or the like).

At step 408, the identification code is directed to be displayed via a display 120 for the user. This could be achieved through a display module or software instructions of a controller 102, which may display the identification code on a display 120 such as a screen, monitor, or any other suitable display device.

At step 410, a second transmission is received via the particular communication protocol. This second transmission is analog and comprises an analog audio. This could be received from the aircraft to a ground station, vice versa, or any other suitable source.

At step 412, the analog audio message is directed to be played to the user. This could be achieved through software instructions of a controller 102, which may direct the analog audio to be played via an audio output jack, audio software module, speakers, headset, or any other suitable audio output device. This allows the user to hear the analog audio message, providing a seamless transition between digital and analog audio transmissions. For instance, the playing of the analog audio may be non-selective, passthrough playing of the analog audio. In other words, the analog audio may be played regardless of identification codes, since the analog audio may not contain identification codes.

The one or more processors 106 of controller 102 may include any one or more processing elements known in the art. In this sense, the one or more processors 106 may include any microprocessor device configured to execute algorithms and/or instructions. In one embodiment, the one or more processors 106 may consist of a desktop computer, mainframe computer system, workstation, image computer, parallel processor, or other computer system (e.g., networked computer) configured to execute a program configured to operate the system 100, as described throughout the present disclosure. It should be recognized that the steps described throughout the present disclosure may be carried out by a single computer system or, alternatively, multiple computer systems. In general, the term "processor" may be broadly defined to encompass any device having one or more processing elements, which execute program instructions from a non-transitory memory medium (e.g., memory 104). Moreover, different subsystems of the system 100 may include processor or logic elements suitable for carrying out at least a portion of the steps described throughout the present disclosure. Therefore, the above description should not be interpreted as a limitation on the present invention but merely an illustration.

The memory medium 104 may include any storage medium known in the art suitable for storing program instructions executable by the associated one or more processors 106. For example, the memory medium 104 may include a non-transitory memory medium. For instance, the memory medium 104 may include, but is not limited to, a read-only memory, a random access memory, a magnetic or optical memory device (e.g., disk), a magnetic tape, a solid state drive and the like. In another embodiment, it is noted herein that the memory 104 is configured to store one or more results from the system 100 and/or the output of the various steps described herein. It is further noted that memory 104 may be housed in a common controller housing with the one or more processors 106. In an alternative embodiment, the memory 104 may be located remotely with respect to the physical location of the processors and controller 102. For instance, the one or more processors 106 of controller 102 may access a remote memory (e.g., server), accessible through a network (e.g., internet, intranet and the like). In another embodiment, the memory medium 104 stores the program instructions for causing the one or more processors 106 to carry out the various steps described through the present disclosure.

All of the methods described herein may include storing results of one or more steps of the method embodiments in a storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

In another embodiment, the controller 102 of the system 100 may be configured to receive and/or acquire data or information from other systems by a transmission medium that may include wireline and/or wireless portions. In another embodiment, the controller 102 of the system 100 may be configured to transmit data or information (e.g., the output of one or more processes disclosed herein) to one or more systems or sub-systems by a transmission medium that may include wireline and/or wireless portions. In this manner, the transmission medium may serve as a data link between the controller 102 and other subsystems of the system 100. Moreover, the controller 102 may send data to external systems via a transmission medium (e.g., network connection).

In another embodiment, the controller 102 of the system 100 may be configured to reduce message collisions by transmitting based on a detected channel availability (e.g., via Control Function) prior to the digital transmissions. For example, the controller 102 may be configured to monitor/listen to the bandwidth for transmissions. The controller 102 may be configured to wait until a clear state (e.g., no transmissions detected) is reached before initiating a transmission (e.g., digital transmission).

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "in embodiments", "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A method comprising:
   receiving, via a system, a digital transmission using a first bandwidth;
   receiving, via the system, an analog transmission using a second bandwidth, wherein the first bandwidth and the second bandwidth are a same bandwidth;
   playing, via the system, a digital audio of the digital transmission using a first audio output;
   playing, via the system, an analog audio of the analog transmission using a second audio output, wherein the first audio output and the second audio output are a same audio output such that the system is simultaneously configured for both the playing of the digital audio and the playing of the analog audio; and
   transmitting a digital outgoing audio message, wherein the transmitting the digital outgoing audio message comprises:
      beginning a recording of an outgoing audio message based on an activation of a user-activatable element of the system communicatively coupled to a controller;
      stopping the recording of the outgoing audio message based on a deactivation of the user-activatable element;
      performing an analog-to-digital conversion of the outgoing audio message;
      appending a stored identification code to the outgoing audio message;
      waiting a cancellation time period; and
      transmitting the outgoing audio message after the cancellation time period, wherein the cancellation time period enables a cancellation of the transmission of the outgoing audio message based on a second activation of the user-activatable element during the cancellation time period,
   wherein the digital transmission comprises an identification code, wherein the playing of the digital audio comprises selectively playing the digital audio based on a match of the identification code with the stored identification code of the system and selectively squelching the digital audio based on a mismatch of the identification code with the stored identification code.

2. The method of claim 1, wherein the stored identification code is an ownship identification code configured to uniquely identify the system.

3. The method of claim 1, wherein the identification code comprises a tail number corresponding to a vehicle.

4. The method of claim 1, wherein the same bandwidth used by the digital transmission and the analog transmission corresponds to a range of radio frequency electromagnetic waves above at least 30 megahertz.

5. The method of claim 1, wherein the same bandwidth used by the digital transmission and the analog transmission is used according to a communication protocol configured for differential 8-phase-shift keying (D8PSK).

6. The method of claim 5, wherein the communication protocol comprises VHF Data Link (VDL) Mode 2.

7. A system comprising:
   a controller, the controller configured to:
      receive a digital transmission using a first bandwidth and to receive an analog transmission using a second bandwidth, wherein the first bandwidth and the second bandwidth are a same bandwidth; and
      direct a playing of a digital audio of the digital transmission using a first audio output; and
   a user-activatable element communicatively coupled to the controller and configured for push-to-talk generation of audio recordings, wherein the controller is further configured to transmit a digital outgoing audio message, wherein the transmitting comprises:
- beginning a recording of an outgoing audio message based on an activation of the user-activatable element;
- stopping the recording of the outgoing audio message based on a deactivation of the user-activatable element;
- performing an analog-to-digital conversion of the outgoing audio message;
- appending a stored identification code to the outgoing audio message;
- waiting a cancellation time period; and
- transmitting the outgoing audio message after the cancellation time period, wherein the cancellation time period enables a cancellation of the transmission of the outgoing audio message based on a second activation of the user-activatable element during the cancellation time period.

8. The system of claim 7, wherein an identification code of the digital transmission comprises a tail number corresponding to a vehicle.

9. The system of claim 7, wherein the digital transmission comprises an identification code, wherein the controller is further configured to selectively play the digital audio based on a match of the identification code with an ownship identification code of the system and to selectively squelch the digital audio based on a mismatch of the identification code with the ownship identification code.

10. The system of claim 7, wherein the controller is further configured to play the analog audio using a second audio output, wherein the first audio output and the second audio output are a same audio output such that the system is simultaneously configured for both the playing of the digital audio and the playing of the analog audio.

11. The system of claim 10, wherein the playing of the analog audio is a non-selective, passthrough playing of the analog audio.

12. The system of claim 7, wherein the same bandwidth used by the digital transmission and the analog transmission corresponds to a range of radio frequency electromagnetic waves above at least 30 megahertz.

13. The system of claim 7, wherein the same bandwidth used by the digital transmission and the analog transmission is used according to a communication protocol configured for differential 8-phase-shift keying (D8PSK).

14. The system of claim 13, wherein the communication protocol comprises VHF Data Link (VDL) Mode 2.

15. A method comprising:
- transmitting a signal indicative of an ability to receive digital transmissions via a particular communication protocol used with analog communications;
- receiving a digital transmission via the particular communication protocol, wherein the digital transmission comprises digital audio and an identification code;
- directing the digital audio to be played to a user;
- directing the identification code to be displayed via a display for the user;
- receiving a second transmission via the particular communication protocol, wherein the second transmission is analog and comprises an analog audio;
- directing the analog audio to be played to the user; and
- transmitting a digital outgoing audio message, wherein the transmitting the digital outgoing audio message comprises:
  - beginning a recording of an outgoing audio message based on an activation of a user-activatable element of a system communicatively coupled to a controller;
  - stopping the recording of the outgoing audio message based on a deactivation of the user-activatable element;
  - performing an analog-to-digital conversion of the outgoing audio message;
  - appending an ownship identification code to the outgoing audio message;
  - waiting a cancellation time period; and
  - transmitting the outgoing audio message after the cancellation time period, wherein the cancellation time period enables a cancellation of the transmission of the outgoing audio message based on a second activation of the user-activatable element during the cancellation time period.

16. The method of claim 15, wherein the digital audio is configured to be selectively played based on a match of the identification code with the ownship identification code of the system and to be selectively squelched based on a mismatch of the identification code with the ownship identification code.

17. The method of claim 15, wherein the identification code of the digital transmission comprises a tail number corresponding to a vehicle.

* * * * *